(12) United States Patent
Lee

(10) Patent No.: US 11,025,862 B1
(45) Date of Patent: Jun. 1, 2021

(54) APPARATUS AND METHOD FOR PROVIDING VIDEO TELEPHONY SERVICE FOR VEHICLE

(71) Applicants: Hyundai Motor Company, Seoul (KR); Kia Motors Corporation, Seoul (KR)

(72) Inventor: Pyoung Hwa Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/995,892

(22) Filed: Aug. 18, 2020

(30) Foreign Application Priority Data

May 18, 2020 (KR) .................... 10-2020-0059252

(51) Int. Cl.
*H04N 7/14* (2006.01)
(52) U.S. Cl.
CPC ............................ *H04N 7/142* (2013.01)
(58) Field of Classification Search
CPC ......................................................... H04N 7/14
USPC ........................................ 348/14.01–14.16
See application file for complete search history.

(56) References Cited

U.S. PATENT DOCUMENTS

| | | | |
|---|---|---|---|
| 2009/0226001 A1* | 9/2009 | Grigsby | G08G 1/0962 381/77 |
| 2015/0256795 A1* | 9/2015 | Chauhan | G06Q 10/10 348/14.02 |
| 2018/0278891 A1* | 9/2018 | Pan | H04N 21/47 |
| 2020/0213560 A1* | 7/2020 | Zhang | G06K 9/00838 |

FOREIGN PATENT DOCUMENTS

KR 10-2011-0018073 A 2/2011

* cited by examiner

*Primary Examiner* — Melur Ramakrishnaiah
(74) *Attorney, Agent, or Firm* — Mintz Levin Cohn Ferris Glovsky and Popeo, P.C.; Peter F. Corless (57) ABSTRACT

A video telephony service provision apparatus for a vehicle is provided. The apparatus includes a display unit having a plurality of window displays that output an image of an occupant of a first other vehicle and a speaker unit having a plurality of speakers that output a voice of the occupant of the first other vehicle. A manipulation unit receives user input requesting a change of output of at least one of the image or the voice of the occupant of the first other vehicle and a controller operates the display unit and the speaker unit.

20 Claims, 6 Drawing Sheets

APPARATUS AND METHOD FOR PROVIDING VIDEO TELEPHONY SERVICE FOR VEHICLE

This application claims the benefit of Korean Patent Application No. 10-2020-0059252, filed on May 18, 2020, which is hereby incorporated by reference as if fully set forth herein.

BACKGROUND

Field of the Disclosure

The present disclosure relates to a video telephony service provision apparatus for a vehicle, and more particularly, to a video telephony service provision apparatus for a vehicle and a method of providing a video telephony service thereof for providing a video telephony service in a plurality of traveling vehicles using a window display for a vehicle.

Discussion of the Related Art

In general, a vehicle call system is a system that transmits information of a subject vehicle to other vehicles or supports a telephone conversation with another vehicle. Particularly, when it is required to transmit information of the subject vehicle, the vehicle call system searches for other surrounding vehicles, accesses the detected vehicle, and then performs voice telephony or video telephony as selected by the user.

However, the vehicle call system is difficult to use in video telephony with occupants other than the driver of each vehicle and is also difficult to use to simultaneously support video telephony among occupants of a plurality of vehicles. Accordingly, there is a need to develop an apparatus for providing a video telephony service for vehicles for establishing call connection with occupants of a plurality of vehicles using a window display of a vehicle.

SUMMARY

An object of the present disclosure is to provide a video telephony service provision apparatus for a vehicle and a method of providing a video telephony service thereof for providing an environment as if occupants of a plurality of vehicles that simultaneously travel were present in the same vehicle by providing a video telephony service in a plurality of traveling vehicles using a window display for a vehicle.

The technical problems solved by the exemplary embodiments are not limited to the above technical problems and other technical problems which are not described herein will become apparent to those skilled in the art from the following description.

To achieve these objects and other advantages and in accordance with the purpose of the disclosure, as embodied and broadly described herein, a video telephony service provision apparatus for a vehicle may include a display unit having a plurality of window displays configured to output an image of an occupant of another vehicle, a speaker unit having a plurality of speakers configured to output a voice of the occupant of the other vehicle, a manipulation unit configured to receive user input of requesting a change of output of at least one of the image or the voice of the occupant of the other vehicle, and a controller configured to operate the display unit and the speaker unit.

When receiving information of the image and the voice of the occupant of the other vehicle, the controller may be configured to select a window display for outputting the image of the occupant of the other vehicle and a speaker for outputting the voice of the occupant of the other vehicle based on a preset reference, operate the display unit and the speaker unit to output the image and the voice of the occupant of the other vehicle to the selected window display and the selected speaker, and operate the display unit and the speaker unit to change the output of the image and the voice of the occupant of the other vehicle according to the user input received from the manipulation unit.

According to another exemplary embodiment, a method of providing a video telephony service of a video telephony service provision apparatus for a vehicle including a controller configured to operate a window display and a speaker may include determining whether information regarding an image and a voice of an occupant of another vehicle is received, by the controller, in response to receiving the information on the image and the voice of the occupant of the other vehicle, selecting a window display for outputting the image of the occupant of the other vehicle and a speaker for outputting the voice of the other vehicle based on a preset reference, by the controller, operating the window display and the speaker to output the image and the voice of the occupant of the other vehicle through the selected window and speaker, by the controller, detecting whether user input of requesting a change of output of the image and the voice of the occupant of the other vehicle is received, by the controller, and in response to receiving the user input, operating the window display and the speaker to change the output of the image and voice of the occupant of the other vehicle according to the user input, by the controller.

According to another exemplary embodiment of the present disclosure, a non-transitory computer-readable recording medium having recorded thereon a program for executing a method of providing a video telephony service of a video telephony service provision apparatus for a vehicle may perform procedures provided by the method of providing a video telephony service of a video telephony service provision apparatus for a vehicle.

According to another exemplary embodiment of the present disclosure, a vehicle may include a communication device configured to communicate with another vehicle, and a video telephony service provision apparatus configured to output an image of an occupant of the other vehicle, received from the communication device, to a window display and to output a voice of the occupant of the other vehicle, received from the communication device, to a speaker.

When receiving information of the image and the voice of the occupant of the other vehicle, the video telephony service provision apparatus may be configured to select a window display for outputting the image of the occupant of the other vehicle and a speaker for outputting the voice of the occupant of the other vehicle based on a preset reference, output the image and the voice of the occupant of the other vehicle to the selected window display and the selected speaker, and change output of the image and the voice of the occupant of the other vehicle according to the user input.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Exemplary embodiments of the present disclosure are described in detail so as for those of ordinary skill in the art to easily implement the present disclosure with reference to the accompanying drawings. However, the present disclosure may be implemented in various different forms and is not limited to these exemplary embodiments. To clearly describe the present disclosure, a part without concerning to the description is omitted in the drawings, and like reference numerals in the specification denote like elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Figure 1:
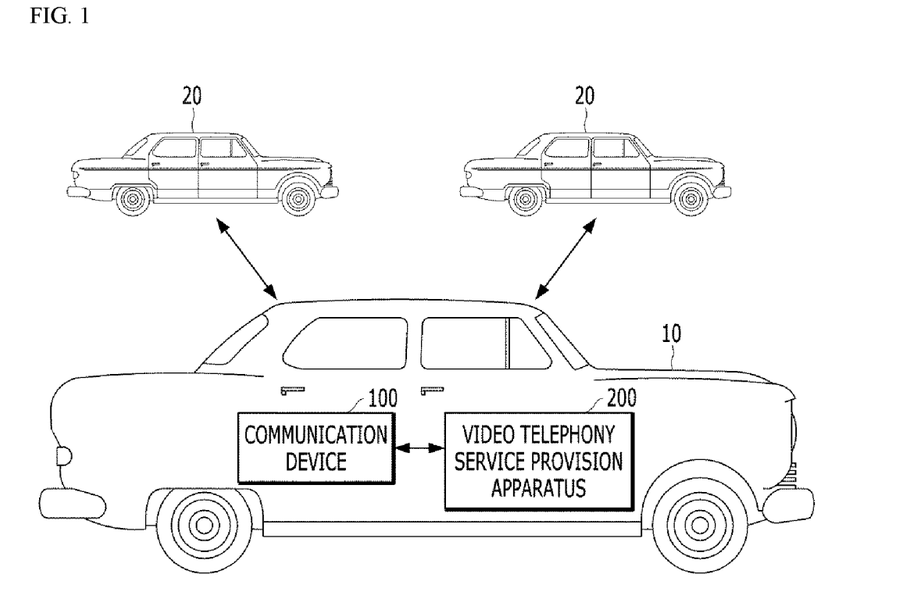
FIG. 1 is a diagram for explaining a vehicle including a video telephony service provision apparatus according to an exemplary embodiment of the present disclosure.

Hereinafter, an apparatus and method of providing a video telephony service for a vehicle, which are applicable to embodiments of the present disclosure, will be described in detail with reference to FIGS. 1 to 9. FIG. 1 is a diagram for explaining a vehicle including a video telephony service provision apparatus according to an exemplary embodiment of the present disclosure.

As shown in FIG. 1, a subject vehicle 10 according to the present disclosure may include a communication device 100 configured to communicate with another vehicle 20 (e.g., a second vehicle) and a video telephony service provision apparatus 200 configured to output an image of the occupant of the other vehicle, received from the communication device 100, to a window display and output the voice of the occupant of the other vehicle, received from the communication device 100, via a speaker.

In particular, when receiving information on the image and the voice of the occupant of the other vehicle, the video telephony service provision apparatus 200 may be configured to select a window display for outputting the image of the occupant of the other vehicle and a speaker for outputting the voice of the occupant of the other vehicle according to a preset reference, may be configured to output the image and the voice of the occupant of the other vehicle to the selected window display and speaker, and may be configured to change the output of the image and the voice of the occupant of the other vehicle according to user input.

During reception of information on the image and voices of the occupant of the other vehicle, when receiving a video telephony request signal from the other vehicle 20 (e.g., a second vehicle among a plurality of other vehicles), the video telephony service provision apparatus 200 may be configured to acquire identification information of the other vehicle 20 based on the video telephony request signal, verify whether the other vehicle 20 is a registered vehicle based on the identification information of the other vehicle 20, transmit a video telephony approval signal to the other vehicle 20 when the other vehicle 20 is a registered vehicle, and may be configured to receive the information on the image and voice of the occupant of the other vehicle from the other vehicle 20.

During reception of the information of the image and voice of the occupant of the other vehicle, when receiving a plurality of request signals for video telephony from a plurality of other vehicles 20, the video telephony service provision apparatus 200 may be configured to determine the order of priority of the plurality of other vehicles 20 based on distances between the subject vehicle 10 and the plurality of other vehicles 20, and may be configured to sequentially receive the information of images and voices of occupants of the other vehicles according to the determined order of priority.

When determining the order of priority of the plurality of other vehicles 20, the video telephony service provision apparatus 200 may be configured to acquire information on distances between the subject vehicle 10 and the plurality of other vehicles 20 positioned around the subject vehicle 10, may be configured to assign the highest priority to the other vehicle 20 (e.g., one of the plurality of other vehicles) positioned closest to the subject vehicle 10 based on the acquired distance information, and assign the lowest priority to the other vehicle 20 (e.g., one of the plurality of other vehicles) positioned farthest from the subject vehicle 10.

Then, when selecting the window display for outputting the images of the occupants of the other vehicles, the video telephony service provision apparatus 200 may be configured to determine the order of priority of the window display based on the distance between an occupant of the subject vehicle and the window display of the subject vehicle, and select the window display for outputting the images of the occupants of the other vehicles according to the determined order of priority.

When determining the order of priority of the window display, the video telephony service provision apparatus 200 may be configured to assign the highest priority to the window display of the subject vehicle located the shortest distance from the occupant of the subject vehicle, and assign the lowest priority to the window display of the subject vehicle located the longest distance from the occupant of the subject vehicle. Then, when selecting the window display for outputting the images of the occupants of the other vehicles, the video telephony service provision apparatus 200 may be configured to select a main occupant among a plurality of occupants of the subject vehicle in the case where there is a plurality of occupants in the subject vehicle, determine the order of priority of the selected window display based on the distance between the selected main occupant and the window display of the subject vehicle, and select the window display for outputting the images of the occupants of the other vehicles according to the determined order of priority.

When selecting the speaker for outputting the voices of the occupants of the other vehicles, the video telephony service provision apparatus 200 may be configured to determine the order of priority of speakers based on distances between the occupant of the subject vehicle and the speakers of the subject vehicle and may be configured to select the speaker for outputting the voices of the occupants of the other vehicles according to the determined order of priority.

In particular, when determining the order of priority of the speakers, the video telephony service provision apparatus 200 may be configured to assign the highest priority to a speaker of the subject vehicle (e.g., one of a plurality of speakers) located the shortest distance from the occupant of the subject vehicle, and assign the lowest priority to a speaker of the subject vehicle (e.g., one of the plurality of speakers) located the longest distance from the occupant of the subject vehicle.

Then, when outputting the images of the occupants of the other vehicles through the selected window display, the video telephony service provision apparatus 200 may be configured to verify whether the number of images of the occupants of the other vehicles, output through the selected window display, is equal to or greater than a reference number, and display the images of the occupants of the other vehicles in a partially overlapping manner when the number of images of the occupants of the other vehicles is equal to or greater than the reference number.

For example, when displaying the images of the occupants of the other vehicles in a partially overlapping manner, the video telephony service provision apparatus 200 may be configured to display an image of the occupants of the other vehicles with a high priority in the foreground, and display an image of the occupants of the other vehicles with a low priority in the background, but the present disclosure is not limited thereto. Then, when changing output of the images of the occupants of the other vehicles, the video telephony service provision apparatus 200 may be configured to change the focus of the images of the occupants of the other vehicles, output to the window display, or change the arrangement order of the images of the occupants of the other vehicles according to user input.

For example, when user input of rotating a manipulation wheel is performed, the video telephony service provision apparatus 200 may be configured to change the focus of the images of the occupants of the other vehicles, output to the window display, and when user input of rotating the manipulation wheel while pushing the same is performed, the video telephony service provision apparatus 200 may be configured to change the arrangement order of the images of the occupants of the other vehicles, output to the window display, but the present disclosure is not limited thereto.

While changing the output of the images of the occupants of the other vehicles, when receiving focus information for focusing on the image of the occupant of the subject vehicle by one of the other vehicles 20 (e.g., a second vehicle of the other vehicles 20), the video telephony service provision apparatus 200 may be configured to change the arrangement order of images of the occupants of the other vehicles, output to the window display, to display the images of the occupants of other vehicles having the highest priority, which correspond to the other vehicles 20, based on the received focus information.

Depending on the case, while changing the output of the images of the occupants of the other vehicles, when receiving a call signal for calling the occupant of the subject vehicle by the second vehicle from the other vehicle 20, the video telephony service provision apparatus 200 may be configured to change the arrangement order of the images of the occupants of the other vehicles, output to the window display, to display the images of the occupants of the other vehicles having the highest priority, which correspond to the second vehicle 20, based on the call signal.

In another case, while changing the output of the images of the occupants of the other vehicles, when receiving focus information of the images of the occupants of the other vehicles, which focus on each other by the other vehicles 20, from the other vehicles 20, the video telephony service provision apparatus 200 may be configured to change the arrangement order of the images of the occupants of the other vehicles output to the window display to display the images of the occupants of the other vehicles having the highest priority, which correspond to the other vehicles 20, based on the received focus information.

Particularly, when displaying the images of the occupants of the other vehicles having the highest priority, the video telephony service provision apparatus 200 may be configured to independently display the images of the occupants of the other vehicles to display the same with the highest priority on a separate window display. When receiving user input for video telephony with the other vehicles, the video telephony service provision apparatus 200 may be configured to acquire the image of the occupant of the subject vehicle and the voice of the occupant of the subject vehicle based on user input, and may be configured to transmit the acquired image of the occupant of the subject vehicle and the voice of the occupant of the subject vehicle to the other vehicles 20 for video telephony.

Figure 2:
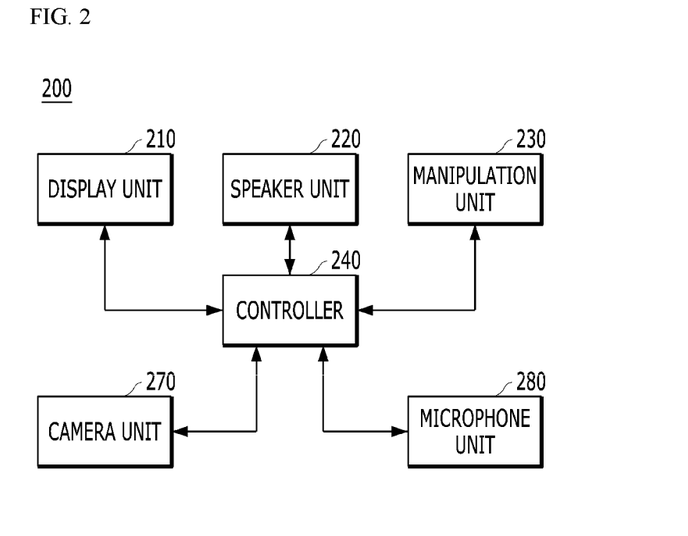
FIG. 2 is a block diagram illustrating the configuration of a video telephony service provision apparatus according to an exemplary embodiment of the present disclosure.

FIG. 2 is a block diagram illustrating the configuration of a video telephony service provision apparatus according to an exemplary embodiment of the present disclosure. As shown in FIG. 2, the video telephony service provision apparatus 200 according to the present disclosure may include a display unit 210 having a plurality of window displays for outputting images of occupants of other vehicles, a speaker unit 220 having a plurality of speakers for outputting voices of the occupants of the other vehicles, a manipulation unit 230 configured to receive user input of requesting a change of output of at least one of the images or voices of the occupants of the other vehicles, and a controller 240 configured to operate the display unit 210 and the speaker unit 220.

The video telephony service provision apparatus 200 according to the present disclosure may further include a camera 270 configured to acquire the image of an occupant of a subject vehicle and a microphone 280 configured to acquire the voice of the occupant of the subject vehicle. In particular, when receiving the information of the images and voices of the occupants of the other vehicles, the controller 240 may be configured to select a window display for outputting the images of the occupants of the other vehicles and a speaker for outputting the voices of the occupants of the other vehicles according to a preset reference, may be configured to operate the display unit 210 and the speaker unit 220 to output the images and voices of the occupants of the other vehicles to the selected window display and speaker, and operate the display unit 210 and the speaker unit 220 to change the output of the images and voices of the occupants of the other vehicles according to user input received from the manipulation unit 230.

During reception of information on the images and voices of the occupants of the other vehicles, in response to receiving a video telephony request signal from the other vehicles, the controller 240 may be configured to acquire identification information of the other vehicles 20 based on the video telephony request signal, verify whether each of the other vehicles is a registered vehicle based on the identification information of each vehicle, transmit a video telephony approval signal to the other vehicles in response to determining that the other vehicle is a registered vehicle, and may the information on the images and voices of the occupants of the other vehicle from each of the other vehicles.

In particular, when acquiring the indication information and voice information of the other vehicles, the controller 240 may be configured to verify whether the identification information of the other vehicles is included in the information of the images and voices of the occupants of the other vehicles, and extract and acquire the identification information of the other vehicles from the information of the images and voices of the occupants of the other vehicles in response to determining that the identification information of the other vehicles is included in the information of the images and voices of the occupants of the other vehicles.

For example, the identification information of the other vehicles may include at least one of a vehicle identification number, a telephone number, or a vehicle owner identifier of the other vehicle, but the present disclosure is not limited thereto. During reception of the information of the images and voices of the occupants of the other vehicles, in response to receiving a plurality of request signals for video telephony from a plurality of other vehicles, the controller 240 may be configured to determine the order of priority of the plurality of other vehicles based on distances between the subject vehicle and the plurality of other vehicles, and sequentially receive the information of the images and voices of the occupants of the other vehicles according to the determined order of priority.

Particular, when determining the order of priority of the plurality of other vehicles, the controller 240 may be configured to acquire information on distances between the subject vehicle and the plurality of other vehicles positioned around the subject vehicle, assign the highest priority to one of the other vehicles (e.g., a second vehicle) positioned closest to the subject vehicle based on the acquired distance information, and assign the lowest priority to one of the other vehicles (e.g., a third vehicle) positioned farthest from the subject vehicle.

Then, during reception of the information of the images and voices of the occupants of the other vehicles, the controller 240 may be configured to perform preprocessing to synchronize information of the images and voices of the occupants of the other vehicles received from a plurality of other vehicles. For example, when synchronizing the information of the images of the occupants of the other vehicles, the controller 240 may be configured to synchronize the sizes and frame rates of the images of the occupants of the plurality of other vehicles, but the present disclosure is not limited thereto.

When selecting the window display for outputting the images of the occupants of the other vehicles, the controller 240 may be configured to determine the order of priority of the window display based on the distance between the occupant of the subject vehicle and the window display of the subject vehicle, and select the window display for outputting the images of the occupants of the other vehicles according to the determined order of priority. In particular, when determining the order of priority of the window display, the controller 240 may be configured to assign the highest priority to the window display of the subject vehicle located the shortest distance from the occupant of the subject vehicle, and assign the lowest priority to the window display of the subject vehicle located the longest distance from the occupant of the subject vehicle.

In other words, when determining the order of priority of window displays, the controller 240 may be configured to set a seat on which the occupant of the subject vehicle sits, as a reference seat, check the distances between the reference seat and all window displays in the subject vehicle, and determine the order of priority of the window displays based on the checked distances. For example, when checking the distances between the reference seat and all window displays in the subject vehicle, the controller 240 may be configured to check distances in a memory for storing information on distances from all window displays for respective seats in the subject vehicle.

When selecting the window display for outputting the images of the occupants of the other vehicles, the controller 240 may be configured to select a main occupant among a plurality of occupants of the subject vehicle when a plurality of occupants are in the subject vehicle, determine the order of priority of the selected window display based on the distance between the selected main occupant and the window display of the subject vehicle, and select the window display for outputting the images of the occupants of the other vehicles according to the determined order of priority.

Particularly, when selecting the main occupant, the controller 240 may be configured to select the main occupant among a plurality of occupants of the subject vehicle according to a preset order of priority. Depending on the case, when selecting the main occupant, the controller 240 may be configured to select the main occupant among a plurality of occupants of the subject vehicle according to user input of directly selecting the main occupant.

In another case, when selecting the main occupant, the controller 240 may be configured to check whether the preset order of priority is present for selecting the main occupant, select the main occupant among a plurality of occupants of the subject vehicle according to the order of priority when a preset order of priority is present, verify whether user input of directly selecting the main occupant is present when no order of priority is present, and select the main occupant among a plurality of occupants according to user input when user input is performed. When checking whether user input is performed, the controller 240 may be configured to output an inquiry about whether the main occupant is selected when an order of priority is not present, and verify whether user input corresponding to or in response to the inquiry has been performed or received.

For example, when generating the inquiry about whether the main occupant is selected, the controller 240 may be configured to operate the display unit 210 to display an inquiry message for inquiring about whether the main occupant is selected through the window display, or operate the speaker unit 220 to output a voice message for inquiring about whether the main occupant is selected through the speaker.

Then, when selecting the voices of the occupants of the other vehicles, the controller 240 may be configured to determine the order of priority of the speakers based on the distance between the occupant of the subject vehicle and the speaker of the subject vehicle and select the speaker for outputting the voices of the occupants of the other vehicles according to the determined order of priority. In particular, when determining the order of priority of the speakers, the controller 240 may be configured to assign the highest priority to a speaker of the subject vehicle located the shortest distance from the occupant of the subject vehicle, and assign the lowest priority to a speaker of the subject vehicle located the longest distance from the occupant of the subject vehicle.

In other words, when determining the order of priority of the speakers, the controller 240 may be configured to set a seat in which the occupant of the subject vehicle sits to a reference seat, check the distances between the reference seat and all speakers in the subject vehicle, and determine the order of priority of the speakers based on the checked distance. For example, when checking the distances between the reference seat and all speakers in the subject vehicle, the controller 240 may be configured to check the distances in a memory for storing information on the distance to the all speakers for respective seats in the subject vehicle.

When selecting the speaker for outputting the voices of the occupants of the other vehicles, the controller 240 may be configured to select a main occupant among a plurality of occupants of the subject vehicle when a plurality of occupants are in the subject vehicle, determine the order of priority of the selected speaker based on the distance between the selected main occupant and the speaker of the subject vehicle, and select the speaker for outputting the voices of the occupants of the other vehicles according to the determined order of priority.

Particularly, when selecting the main occupant, the controller 240 may be configured to select the main occupant among a plurality of occupants of the subject vehicle according to a preset order of priority. Depending on the case, when selecting the main occupant, the controller 240 may be configured to select the main occupant among a plurality of occupants of the subject vehicle according to user input of directly selecting the main occupant.

In another case, when selecting the main occupant, the controller 240 may be configured to check whether a preset order of priority is present for selecting the main occupant, select the main occupant among a plurality of occupants of the subject vehicle according to the order of priority when a preset order of priority is present, verify whether user input of directly selecting the main occupant is present when no order of priority is present, and select the main occupant among a plurality of occupants according to user input when user input is performed.

When checking whether user input is performed, the controller 240 may be configured to generate and output an inquiry about whether the main occupant is selected when no order of priority is present, and verify whether user input corresponding to the inquiry has been received. For example, when generating the inquiry about whether the main occupant is selected, the controller 240 may be configured to operate the display unit 210 to display an inquiry message for inquiring about whether the main occupant is selected through the window display, or operate the speaker unit 220 to output a voice message for inquiring about whether the main occupant is selected through the speaker.

When outputting the images of the occupants of the other vehicles through the selected window display, the controller 240 may be configured to determine the arrangement order of a plurality of images of the occupants of the other vehicles according to the order of priority when the plurality of images of the occupants of the other vehicles is output on the selected window display, and operate the display unit 210 to display the plurality of images of the occupants of the other vehicles on the window display according to the determined arrangement order.

Particularly, when displaying the plurality of images of the occupants of the other vehicles on the window display, the controller 240 may be configured to operate the display unit 210 to display an image of the occupant of the other vehicle (e.g., a second vehicle) with a high priority in a portion of an entire region of the selected window display, which is close or proximate to the occupant of the subject vehicle, and to display an image of the occupant of the other vehicle (e.g., a third vehicle) with a low priority in a portion of the entire region of the selected window display, which is far or distant from the occupant of the subject vehicle.

Depending on the case, when displaying the plurality of images of the occupants of the other vehicles on the window display, the controller 240 may also be configured to operate the display unit 210 to display an image of an occupant of another vehicle (e.g., a fourth vehicle) having a low priority to be smaller than an image of an occupant of another vehicle having a high priority (e.g., a fifth vehicle). When outputting the images of the occupants of the other vehicles through the selected window display, the controller 240 may be configured to verify whether the number of images of occupants of the other vehicles output through the selected window display is equal to or greater than a reference number, and in response to determining that the number of the images of the occupants of the other vehicles is equal to or greater than the reference number, the controller 240 may be configured to operate the display unit 210 to display the images of the occupants of the other vehicles in a partially overlapping manner.

For example, when displaying the images of the occupants of the other vehicle in a partially overlapping manner, the controller 240 may be configured to display an image of an occupant of another vehicle having a high priority in the foreground, and display an image of an occupant of another vehicle having a low priority in the background. In particular, when displaying the images of the occupants of the other vehicles in a partially overlapping manner, the controller 240 may be configured to display the images of the occupants of the other vehicles, displayed in the background, to be smaller than the images of the occupants of the other vehicles, displayed in the foreground.

Depending on the case, when displaying the images of the occupants of the other vehicles in a partially overlapping manner, the controller 240 may be configured to operate the display unit 210 to display the images of the occupants of the other vehicles in such a way that faces of the occupants do not overlap each other and upper bodies of the occupants overlap each other in the images of the occupants of the other vehicles. This is because a plurality of occupants of the other vehicles needs to be accurately and easily identified and recognized.

Then, while changing the output of the image of the occupant of the other vehicles, in response to receiving user input from the manipulation unit 230, the controller 240 may be configured to change the focus of the images of the occupants of the other vehicles, output to the window display, or change the arrangement order of the images of the occupants of the other vehicles according to user input. For example, when user input of rotating a manipulation wheel is performed, the controller 240 may be configured to change the focus of the images of the occupants of the other vehicles output to the window display, and when user input of rotating the manipulation wheel while pushing the same is performed, the controller 240 may be configured to change the arrangement order of the images of the occupants of the other vehicles, output to the window display.

Depending on the case, while changing the output of the images of the occupants of the other vehicles, in response to receiving focus information for focusing on the image of the occupant of the subject vehicle from the other vehicles, the controller 240 may be configured to change the arrangement order of the images of the occupants of the other vehicles, output to the window display, to display an image of the occupant of the other vehicle (e.g., a highest priority vehicle) corresponding to the other vehicle having the highest priority based on the received focus information.

In another case, while changing the output of the images of the occupants of the other vehicles, in response to receiving a call signal for calling the occupant of the subject vehicle by other vehicle from another vehicle, the controller 240 may be configured to change the arrangement order of the images of the occupants of the other vehicles output to the window display to display the image of the occupant of the other vehicle having the highest priority (e.g., a highest priority vehicle), which corresponds to the other vehicle, based on the received call signal. In particular, when displaying the images of the occupants of the other vehicles with the highest priority, the controller 240 may be configured to operate the display unit 210 to highlight the image of the occupant of the other vehicle to display the same with the highest priority.

In another case, while changing the output of the images of the occupants of the other vehicles, in response to receiving focus information of the images of the occupants of the other vehicles, which focus on each other by counterpart vehicles, from the other vehicles, the controller 240 may be configured to change the arrangement order of the images of the occupants of the other vehicles, output to the window display, to display the images of the occupants of the other vehicles having the highest priority, based on the received focus information.

Particularly, when displaying the image of the occupant of the other vehicle having the highest priority (e.g., a second vehicle or highest priority vehicle), the controller 240 may be configured to operate the display unit 210 to independently display the image of the occupant of the other vehicle to display the same with the highest priority in a separate window display. When displaying the image of the occupant of the other vehicle having the highest priority, the controller 240 may be configured to operate the display unit 210 to highlight the image of the occupant of the other vehicle to display the same with the highest priority.

The manipulation unit 230 may include a manipulation wheel, but the present disclosure is not limited thereto. For example, the manipulation unit 230 may be configured to receive at least one of first user input of rotating the manipulation wheel or second user input of rotating the manipulation wheel while pushing the same. In response to receiving user input for video telephony with the other vehicle, the controller 240 may be configured to operate the camera 270 and the microphone 280 to acquire the image and voice of the occupant of the subject vehicle based on user input, and transmit the acquired image and the acquired voice of the occupant of the subject vehicle to the other vehicles for video telephony.

Accordingly, the present disclosure may provide a video telephony service in a plurality of traveling vehicles using a window display for a vehicle, and thus may provide an environment as if occupants of a plurality of vehicles that travel simultaneously were present in the same vehicle. According to the present disclosure, the occupants of a plurality of vehicles may use a passenger compartment of a vehicle as a meeting space.

Figure 3:
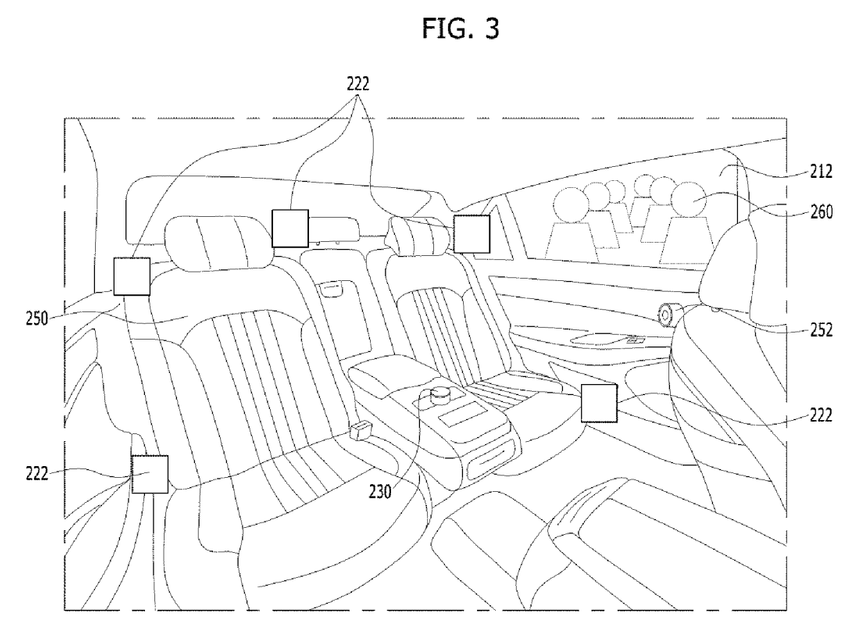
FIG. 3 is a diagram showing a passenger compartment of a vehicle for providing a video telephony service according to the present disclosure.

FIG. 3 is a diagram showing a passenger compartment of a vehicle for providing a video telephony service according to the present disclosure. As shown in FIG. 3, a video telephony service provision apparatus according to the present disclosure may be configured to select a window display 212 for outputting an other-vehicle occupant image 260 and a speaker 222 for outputting an other-vehicle occupant voice based on a preset reference when receiving the information of the images and voices of the occupants of the other vehicles, may be configured to output the other-vehicle occupant image 260 and the voice to the selected window display 212 and the selected speaker 222, and may be configured to change the output of the other-vehicle occupant image 260 and the voice according to user input that is input through the manipulation unit 230.

According to the present disclosure, when the order of priority of the window display 212 is determined, the window display 212 of the subject vehicle positioned closest to the occupant of the subject vehicle may be assigned the highest priority (e.g., a highest priority window display), and the window display 212 of the subject vehicle positioned farthest from the occupant of the subject vehicle may be assigned the lowest priority (e.g., a lowest priority window display). For example, according to the present disclosure, when the order of priority of the window display 212 is determined, a seat 250 in which the occupant of the subject vehicle sits on may be set to a reference seat, distances between the reference seat and all of the window displays 212 in the subject vehicle may be checked, and the order of priority of the window displays 212 may be determined based on the checked distance.

According to the present disclosure, the order of priority of the speakers 222 may be determined based on the distances between the occupant of the subject vehicle and the speakers 222 of the subject vehicle, and the speaker 222 for outputting the other-vehicle occupant voice may be selected according to the determined order of priority. In particular, when the order of priority of the speakers 222 is determined, the speaker 222 of the subject vehicle, positioned closest to the occupant of the subject vehicle, may be assigned the highest priority, and the speaker 222 of the subject vehicle positioned farthest from the occupant of the subject vehicle may be assigned the lowest priority.

According to the present disclosure, when output of the images of the occupants of the other vehicles is changed, if user input is received from the manipulation unit 230, the focus of the images of the occupants of the other vehicles output to the window display may be changed, or the arrangement order of the images of the occupants of the other vehicles may be changed according to user input.

For example, according to the present disclosure, when user input of rotating a manipulation wheel of the manipulation unit 230 is performed, the focus of the other-vehicle occupant image 260 output to the window display 212 may be changed, and when user input of rotating the manipulation wheel of the manipulation unit 230 while pushing the same is performed, the arrangement order of the other-vehicle occupant images 260 output to the window display 212 may be changed.

According to the present disclosure, when user input for video telephony with the other vehicle is received, the image of the occupant of the subject vehicle may be acquired from a camera 252, the voice of the occupant of the subject vehicle may be acquired from a microphone, and the acquired image and voice may be transmitted to the other vehicle according to user input.

For example, according to the present disclosure, the other vehicle may be invited to or accepted into a video telephony conversation with the other vehicle using a vehicle telephone number or the like as an identifier. In other words, according to the present disclosure, a network may be established by inviting and accepting occupants of a vehicle to a vehicle group based on a vehicle telephone number, irrespective of the position of the vehicles.

In particular, according to the present disclosure, the face and upper body of an occupant of a vehicle may be photographed, and the voice of the occupant may be recorded. Accordingly, when two or more vehicles participate in the group, the start time of the video telephony service may be set. According to the present disclosure, the occupant may be photographed using the camera 252 positioned in front of the face of the occupant among one or more cameras installed in a vehicle, and the voice of the occupant may be recorded using the microphone positioned closest to the occupant among one or more microphones installed in the vehicle.

Figure 4:
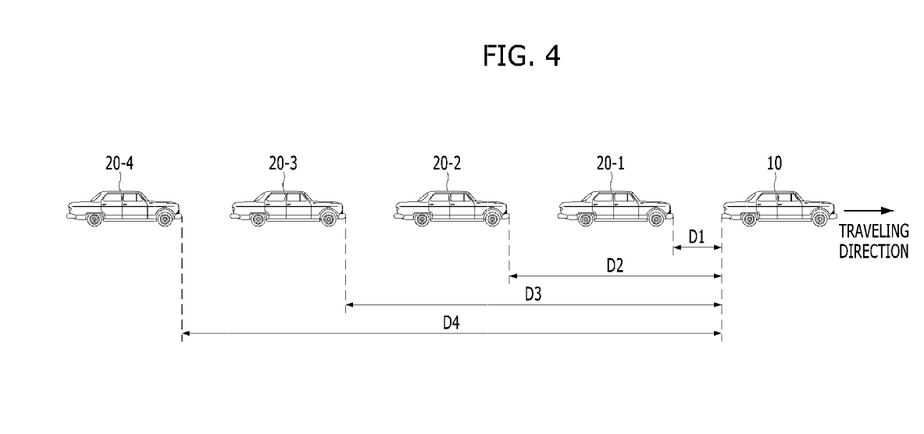
FIGS. 4 and 5 are diagrams for explaining the arrangement order of a plurality of images of occupants of other vehicles.
Figure 5:
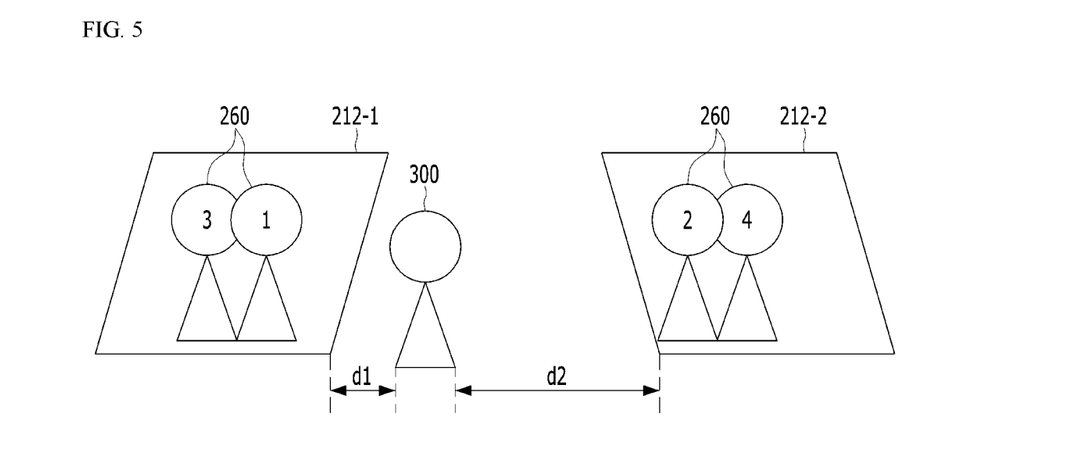

FIGS. 4 and 5 are diagrams for explaining the arrangement order of a plurality of images of occupants of other vehicles. As shown in FIG. 4, according to the present disclosure, when a plurality of request signals for video telephony is received from a plurality of other vehicles, the order of priority of the plurality of other vehicles 20 may be determined based on distances between the subject vehicle 10 and each of the plurality of other vehicles 20, and information of the images and voices of the occupants of the other vehicles may be sequentially received according to the determined order of priority.

For example, according to the present disclosure, distances D1, D2, D3, and D4 between the subject vehicle 10 and first, second, third, and fourth other vehicles 20-1, 20-2, 20-3, and 20-4, positioned around the subject vehicle 10, may be acquired, and a first other vehicle 20-1 positioned closest to the subject vehicle 10 may be assigned the highest priority and a fourth other vehicle 20-4 positioned farthest from the subject vehicle 10 may be assigned the lowest priority based on the acquired distances.

As shown in FIG. 5, according to the present disclosure, the order of priority of the window displays 212 may be determined based on distances between a subject-vehicle occupant 300 and the window display 212 of the subject vehicle, the window display 212 for outputting the other-vehicle occupant image 260 may be selected according to the determined order of priority, and the other-vehicle occupant image 260 may be output to the selected window display 212.

For example, according to the present disclosure, distances d1 and d2 between the subject-vehicle occupant 300 and first and second window displays 212-1 and 212-2 positioned around the subject-vehicle occupant 300 may be acquired, and the first window display 212-1 of the subject vehicle located the shortest distance from the subject-vehicle occupant 300, may be assigned the highest priority, and the second window display 212-2 of the subject vehicle located the longest distance from the subject-vehicle occupant 300, may be assigned the lowest priority, based on the acquired distances.

Thus, as shown in FIGS. 4 and 5, when the first, second, third, and fourth other vehicles 20-1, 20-2, 20-3, and 20-4 positioned around the subject vehicle 10 are one group, the first other-vehicle occupant image 260 received from the first other vehicle 20-1 may be displayed on the first window display 212-1 of the subject vehicle, the second other-vehicle occupant image 260 received from the second other vehicle 20-2 may be displayed on the second window display 212-2 of the subject vehicle, the third other-vehicle occupant image 260 received from the third other vehicle 20-3 may be displayed on the first window display 212-1 of the subject vehicle, and the second other-vehicle occupant image 260 received from the fourth other vehicle 20-4 may be displayed on the second window display 212-2 of the subject vehicle, according to a predetermined order of priority.

In the first window display 212-1, the first other-vehicle occupant image 260 may be disposed closer to the subject-vehicle occupant 300 than the third other-vehicle occupant image 260. In the second window display 212-2, the second other-vehicle occupant image 260 may be disposed closer to the subject-vehicle occupant 300 than the fourth other-vehicle occupant image 260.

Accordingly, when the plurality of other-vehicle occupant images 260 is output to the selected window display 212, the arrangement order of the plurality of other-vehicle occupant images 260 may be determined according to the order of priority, and the plurality of other-vehicle occupant images 260 may be displayed on the window display 212 according to the determined arrangement order. According to the present disclosure, one other-vehicle occupant image 260 having a high priority may be displayed in a portion of the selected window display 212 that is close to the subject-vehicle occupant 300, and one other-vehicle occupant image 260 having a low priority may be displayed in a portion of the selected window display 212 that is far from the subject-vehicle occupant 300. Depending on the case, the other-vehicle occupant image 260 having a low priority may be displayed smaller than the other-vehicle occupant image 260 having a high priority.

According to the present disclosure, whether the number of other-vehicle occupant images 260 output to the selected window display 212 is equal to or greater than a reference number may be checked, and when the number of the other-vehicle occupant images 260 is equal to or greater than the reference number, the other-vehicle occupant images 260 may be displayed in a partially overlapping manner. For example, according to the present disclosure, one other-vehicle occupant image 260 having a high priority may be displayed in the foreground, and one other-vehicle occupant image 260 having a low priority may be displayed in the background.

In particular, the other-vehicle occupant image 260 displayed in the background may also be displayed smaller than the other-vehicle occupant image 260 displayed in the foreground. Accordingly, when it is difficult to show all images of occupants of other vehicles in consideration of the size of the window display 212, the images may be displayed in a partially overlapping manner.

According to the present disclosure, when upper bodies of the occupants of one of the other vehicles overlap each other, the images of the occupants of the other vehicle may be displayed in such a way that the faces of the occupants of the other vehicle overlap each other. The portions of the images of the occupants of one of the other vehicles that overlap each other may maximize use of a special sense and a sense of perspective by representing the portions of the images in the form of a semicircle rather than a single line.

Figure 6:
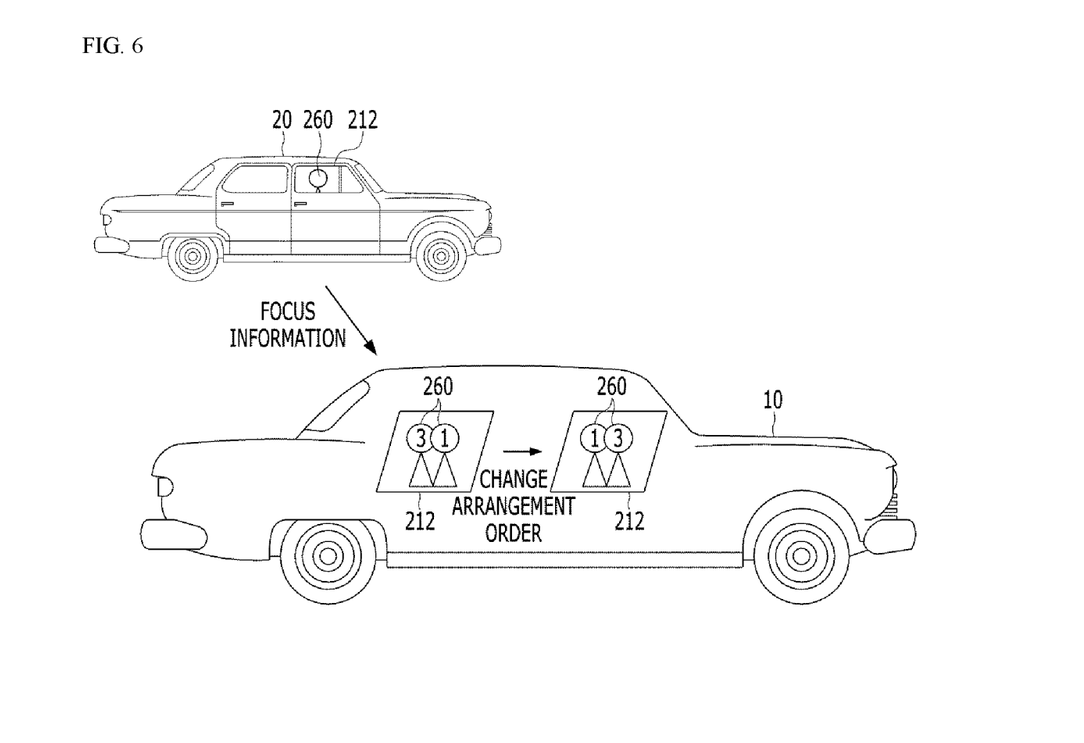
FIGS. 6 to 8 are diagrams for explaining change in the arrangement order of a plurality of images of occupants of other vehicles.
Figure 7:
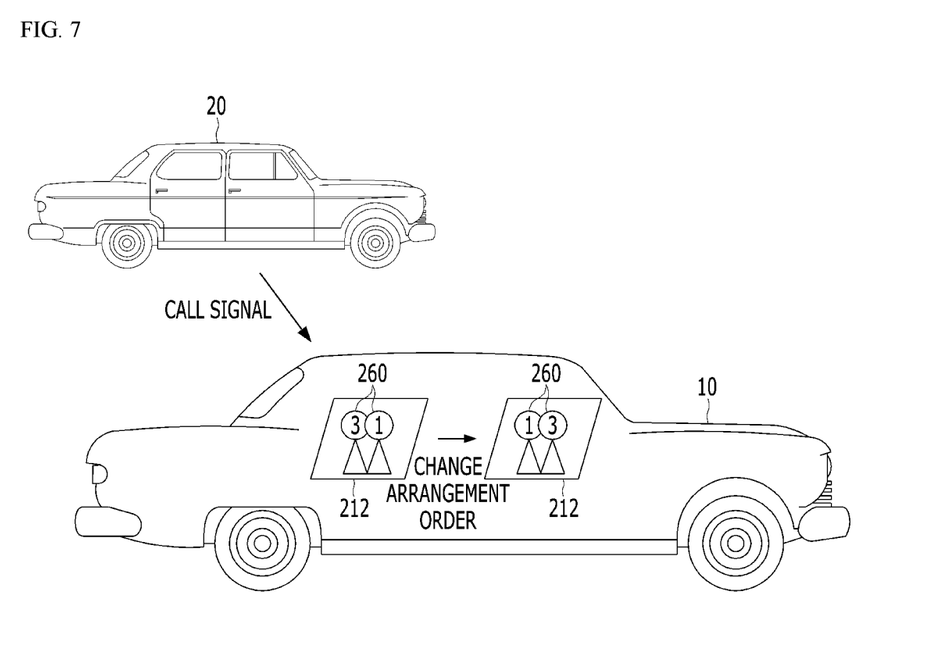
Figure 8:
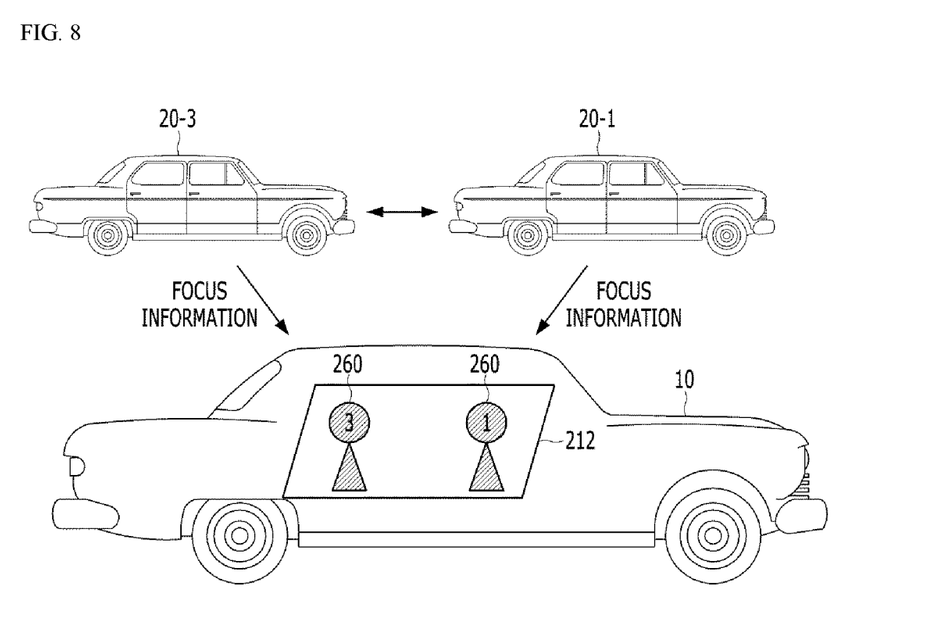

FIGS. 6 to 8 are diagrams for explaining change in the arrangement order of a plurality of images of occupants of other vehicles. As shown in FIGS. 6 to 8, according to the present disclosure, when receiving user input through a manipulation wheel, the focus of the other-vehicle occupant images 260 output to the window display 212 may be changed, or the arrangement order of the other-vehicle occupant images 260 may be changed according to user input.

For example, according to the present disclosure, when user input of rotating the manipulation wheel is performed, the focuses of the other-vehicle occupant images 260 output to the window display 212 may be changed, and when user input of rotating the manipulation wheel while pushing the same is performed, the arrangement order of the other-vehicle occupant images 260 output to the window display 212 may be changed.

Depending on the case, according to the present disclosure, as shown in FIG. 6, when the focus information for focusing on the image of the occupant of the subject vehicle by the other vehicle is received from the other vehicle 20, the arrangement order of the other-vehicle occupant images 260 output to the window display 212 may be changed to display the other-vehicle occupant image 260 having the highest priority, which corresponds to the other vehicle 20, based on the received focus information.

For example, in the window display 212 of the subject vehicle 10, when the first other-vehicle occupant image is displayed with a higher order of priority than the third other-vehicle occupant image, if focus information for focusing on the image of the occupant of the subject vehicle 10 by the third other vehicle is received from the third other vehicle, the arrangement order of the other-vehicle occupant images 260 may be changed to display the third other-vehicle occupant image with a higher order of priority than the first other-vehicle occupant image.

Particularly, according to the present disclosure, the other-vehicle occupant images 260 may be displayed to highlight the other-vehicle occupant image 260 displayed with the highest priority. In another case, according to the present disclosure, as shown in FIG. 7, when a call signal for calling the occupant of the subject vehicle 10 by one of the other vehicles is received from the other vehicles 20, the arrangement order of the other-vehicle occupant images 260 output to the window display 212 may be changed to display the other-vehicle occupant image 260 having the highest priority, which corresponds to the other vehicle 20 that transmitted the call signal.

For example, in the window display 212 of the subject vehicle 10, when the first other-vehicle occupant image is displayed with a higher order of priority than the third other-vehicle occupant image, if a call signal for calling the occupants of the subject vehicle 10 by the third other vehicle is received from the third other vehicle, the arrangement order of the other-vehicle occupant image 260 may be changed to display the third other-vehicle occupant image with a higher priority than the first other-vehicle occupant image.

Particularly, the other-vehicle occupant images 260 may be displayed to highlight the other-vehicle occupant image 260 with the highest priority. In another case, according to the present disclosure, as shown in FIG. 8, when focus information on the other-vehicle occupant images 260, which focus on each other by counterpart vehicles, is received from the other vehicles 20, the arrangement order of the other-vehicle occupant images 260 output to the window display 212 may be changed to display the other-vehicle occupant image 260 having the highest priority, which corresponds to the other vehicles 20, based on the received focus information.

For example, when a window display of the first other vehicle 20-1 focuses on an image of an occupant of the third other vehicle 20-3 and a window display of the third other vehicle 20-3 focuses on an image of an occupant of the first other vehicle 20-1, if the subject vehicle 10 receives focus information corresponding thereto from the first other vehicle 20-1 and the third other vehicle 20-3, the window display 212 of the subject vehicle 10 may change the arrangement order of the other-vehicle occupant images 260 to display the first other-vehicle occupant image and the third other-vehicle occupant image which respectively focus on each other by the first and third other vehicles 20-1 and 20-3.

According to the present disclosure, the other-vehicle occupant images 260 may be displayed to highlight the other-vehicle occupant image 260 displayed with the highest priority. Additionally, the other-vehicle occupant images 260 displayed with the highest priority may be independently displayed in the separate window display 212.

Figure 9:
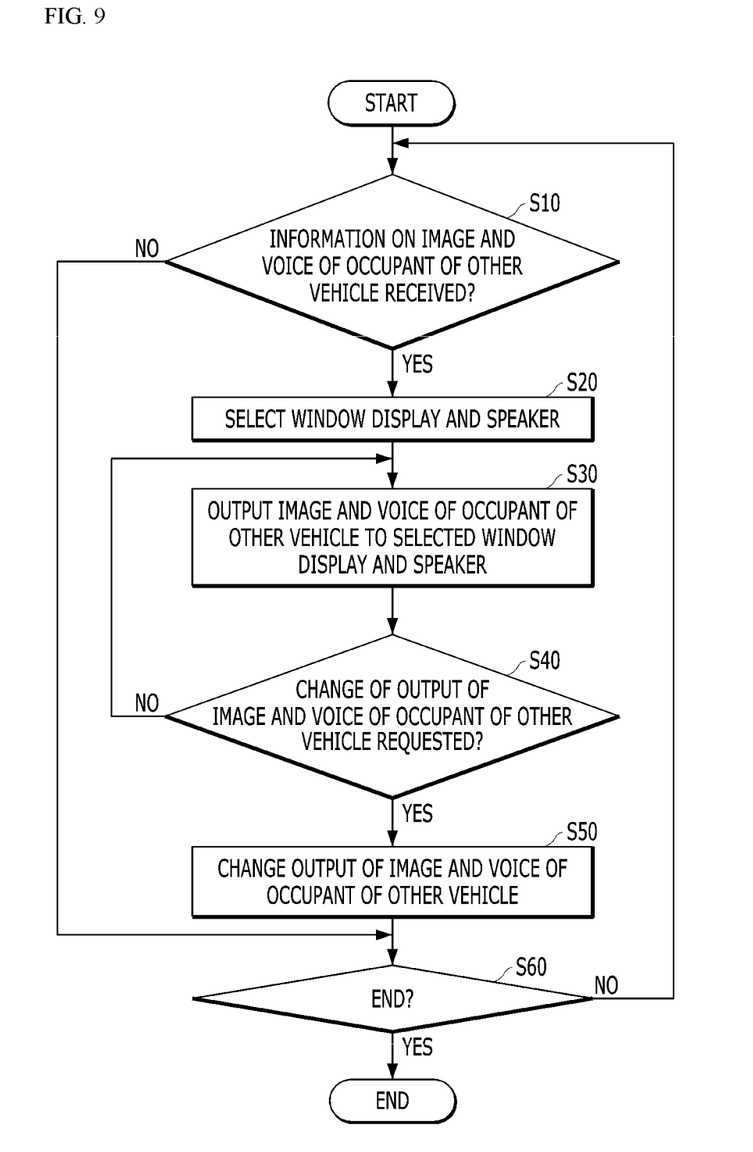
FIG. 9 is a flowchart for explaining a method of providing a video telephony service of a video telephony service provision apparatus according to an exemplary embodiment of the present disclosure.

FIG. 9 is a flowchart for explaining a method of providing a video telephony service of a video telephony service provision apparatus according to an exemplary embodiment of the present disclosure. The method described herein below may be executed by the controller. As shown in FIG. 9, according to the present disclosure, whether information of an image and a voice of an occupant of another vehicle is received may be checked (S10).

According to the present disclosure, when the information of the image and the voice of the occupant of the other vehicle is received, a window for outputting the image of the occupant of the other vehicle and a speaker for outputting the voice of the occupant of the other vehicle may be selected according to a preset reference (S20). In particular, the order of priority of window displays may be determined based on the distance between an occupant of a subject vehicle and the window display of the subject vehicle, and the window display for outputting the image of the occupant of the other vehicle may be selected according to the determined order of priority.

Depending on the case, when a plurality of occupants are present in the subject vehicle, a main occupant may be selected among the plurality of occupants of the subject vehicle, the order of priority of the selected window display may be determined based on the distance between the selected main occupant and the window display of the subject vehicle, and the window display for outputting the images of the occupants of the other vehicles may be selected according to the determined order of priority.

According to the present disclosure, the order of priority of the speakers may be determined based on distances between the occupants of the subject vehicle and the speakers of the subject vehicle, and the speaker for outputting the other-vehicle occupant voice may be selected according to the determined order of priority. Then, the image and voice of the occupants of the other vehicle may be output through the selected window display and the selected speaker (S30).

Additionally, whether the number of images of the occupants of the other vehicle, output to the selected window display, is equal to or greater than a reference number may be checked, and in response to determining that the number of images of the occupants of the other vehicle is equal to or greater than the reference number, the images of the occupants of the other vehicles may be displayed to overlap each other. Then, whether a request for changing output of the images and voices of the occupants of the other vehicles is present may be checked (S40).

In response to receiving the request for changing output of the images and voices of the occupants of the other vehicles, the output of the images and voices of the occupants of the other vehicles may be changed (S50). In particular, focuses of the images of the occupants of the other vehicles, output to the window display, may be changed, or the arrangement order of the images of the occupants of the other vehicles may be changed according to user input.

Depending on the case, when focus information for focusing on the image of the occupant of the subject vehicle by the other vehicle is received from the other vehicles, the arrangement order of images of the occupants of the other vehicles, output to the window display, may be changed to display the images of the occupants of other vehicles having the highest priority, which correspond to the other vehicles, based on the received focus information. In another case, according to the present disclosure, when a call signal for calling the occupant of the subject vehicle by the other vehicle is received from the other vehicles, the arrangement order of the images of the occupants of the other vehicles, output to the window display, may be changed to display the images of the occupants of the other vehicles having the highest priority, which correspond to the other vehicle having transmitted the call signal.

In another case, according to the present disclosure, when focus information of the images of the occupants of the other vehicles, which focus on each other by counterpart vehicles, is received from the other vehicles, the arrangement order of the images of the occupants of the other vehicles, output to the window display, may be changed to display the images of the occupants of the other vehicles having the highest priority, which correspond to the other vehicles, based on the received focus information.

Then, whether a video telephony service is terminated may be checked (S60), and when the video telephony service is terminated, provision of the video telephony service may be terminated. Accordingly, the present disclosure may provide a video telephony service in a plurality of traveling vehicles using a window display for a vehicle, and thus may provide an environment as if occupants of a plurality of vehicles that simultaneously travel were present in the same vehicle.

The present disclosure may provide an environment as if the occupants of a plurality of vehicles were traveling together in the same vehicle. According to the present disclosure, the occupants of a plurality of vehicles may use a passenger compartment of a vehicle as a meeting space.

According to the present disclosure, a non-transitory computer-readable recording medium having recorded thereon a program for executing a method of providing a video telephony service of a video telephony service provision apparatus for a vehicle may perform procedures provided by the method of providing a video telephony service of a video telephony service provision apparatus for a vehicle according to an exemplary embodiment of the present disclosure.

The method of providing a video telephony service of a video telephony service provision apparatus for a vehicle according at least one exemplary embodiment of the present disclosure as configured above may provide a video telephony service in a plurality of traveling vehicles using a window display for a vehicle, and thus may provide an environment as if the occupants of a plurality of vehicles that simultaneously travel were present in the same vehicle.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer-readable code stored on a non-transitory computer-readable recording medium. The non-transitory computer-readable recording medium is any data storage device that may store data which can thereafter be read by a computer. Examples of the non-transitory computer-readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the exemplary embodiments. Thus, it is intended that the present disclosure cover the modifications and variations of the exemplary embodiment provided they come within the scope of the appended claims and their equivalents.

What is claimed is:

1. A video telephony service provision apparatus for a vehicle, comprising:
    a display unit including a plurality of window displays configured to output an image of an occupant of a first other vehicle among a plurality of other vehicles;
    a speaker unit including a plurality of speakers configured to output a voice of the occupant of the first other vehicle;
    a manipulation unit configured to receive user input of requesting a change of output of at least one of the image or the voice of the occupant of the first other vehicle; and
    a controller configured to operate the display unit and the speaker unit,
    wherein, in response to receiving information of the image and the voice of the occupant of the first other vehicle, the controller is configured to:
        select a window display for outputting the image of the occupant of the first other vehicle and a speaker for outputting the voice of the occupant of the first other vehicle based on a preset reference;

operate the display unit and the speaker unit to output the image and the voice of the occupant of the first other vehicle to the selected window display and the selected speaker; and operate the display unit and the speaker unit to change the output of the image and the voice of the occupant of the first other vehicle according to the user input received from the manipulation unit, wherein the preset reference includes a distance between an occupant of a subject vehicle and a window display of the subject vehicle.

2. The video telephony service provision apparatus for the vehicle of claim 1, wherein, when selecting the window display for outputting the image of the occupant of the first other vehicle, the controller is configured to determine an order of priority of the window display based on the distance between the occupant of the subject vehicle and the window display of the subject vehicle, and select the window display for outputting the image of the occupant of the first other vehicle according to the determined order of priority.

3. The video telephony service provision apparatus for the vehicle of claim 2, wherein, when determining the order of priority of the window display, the controller is configured to assign a highest priority to a window display of the subject window located a shortest distance from the occupant of the subject vehicle, and assign a lowest priority to a window display of the subject window located a longest distance from the occupant of the subject vehicle.

4. The video telephony service provision apparatus for the vehicle of claim 1, wherein, when the window display for outputting the image of the occupant of the first other vehicle is selected, if a plurality of occupants are in the subject vehicle, the controller is configured to select a main occupant among the plurality of occupants of the subject vehicle, determine an order of priority of the window display of the subject vehicle based on a distance between the selected main occupant and the window display of the subject vehicle, and select the window display for outputting the image of the occupant of the first other vehicle according to the determined order of priority.

5. The video telephony service provision apparatus for the vehicle of claim 1, wherein, when selecting the speaker for outputting the voice of the occupant of the first other vehicle, the controller is configured to determine an order of priority of a speaker of the subject vehicle based on a distance between the occupant of the subject vehicle and the speaker of the subject vehicle, and select the speaker for outputting the voice of the occupant of the first other vehicle according to the determined order of priority.

6. The video telephony service provision apparatus for the vehicle of claim 5, wherein, when determining the order of priority of the speaker, the controller is configured to assign a highest priority to a speaker of the subject vehicle located a shortest distance from the occupant of the subject vehicle, and assign a lowest priority to a speaker of the subject vehicle located a longest distance from the occupant of the subject vehicle.

7. The video telephony service provision apparatus for the vehicle of claim 1, wherein, when outputting the image of the occupant of the first other vehicle through the selected window display, the controller is configured to check whether the number of images of occupants of the plurality of other vehicles, output to the selected window display, is equal to or greater than a reference number, and operate the display unit to display images of the occupants of the other vehicles in a partially overlapping manner when the number of the images of the occupants of the other vehicles is equal to or greater than the reference number.

8. The video telephony service provision apparatus for the vehicle of claim 1, wherein, while changing the output of the image of the occupant of the first other vehicle, in response to receiving the user input from the manipulation unit, the controller is configured to change focus of the image of the occupant of the first other vehicle, output to the window display, or change an arrangement order of images of occupants of the plurality of other vehicles according to the user input.

9. The video telephony service provision apparatus for the vehicle of claim 1, wherein, while changing the output of the image of the occupant of the first other vehicle, in response to receiving focus information for focusing on the image of the occupant of the subject vehicle by the first other vehicle from the subject vehicle, the controller is configured to change an arrangement order of images of occupants of the plurality of other vehicles, output to the window display, to display the image of the occupant of the other vehicles having a highest priority, which corresponds to the first other vehicle, based on the received focus information.

10. The video telephony service provision apparatus for the vehicle of claim 1, wherein, while changing the output of the image of the occupant of the first other vehicle, in response to receiving a call signal for calling the occupant of the subject vehicle from the first other vehicle, the controller is configured to change an arrangement order of images of occupants of the plurality of other vehicles, output to the window display, to display the image of the occupant of the other vehicles having a highest priority, which corresponds to the first other vehicle having transmitted the received call signal.

11. The video telephony service provision apparatus for the vehicle of claim 1, wherein, while changing the output of the image of the occupant of the first other vehicle, in response to receiving focus information of images of occupants of the plurality of other vehicles, which focus on each other, from the other vehicles, the controller is configured to change an arrangement order of the images of the occupants of the other vehicles, output to the window display, to display the images of the occupants of the other vehicles having a highest priority, which corresponds to the first other vehicle, based on the received focus information.

12. The video telephony service provision apparatus for the vehicle of claim 11, wherein, when displaying the images of the occupants of the other vehicles having a highest priority, which corresponds to the first other vehicle, the controller is configured to operate the display unit to independently display the images of the occupants of the other vehicles to display the images of the occupants of the other vehicles with the highest priority on a separate window display.

13. The video telephony service provision apparatus for the vehicle of claim 1, further comprising:
 a camera configured to acquire an image of the occupant of the subject vehicle; and
 a microphone configured to acquire a voice of the occupant of the subject vehicle,
 wherein, in response to receiving the user input for video telephony with the first other vehicle, the controller is configured to operate the camera and the microphone to acquire the image of the occupant of the subject vehicle and the voice of the occupant of the subject vehicle based on the user input, and transmit the acquired image of the occupant of the subject vehicle and the acquired voice of the occupant of the subject vehicle to the first other vehicle for video telephony.

14. A method of providing a video telephony service of a video telephony service provision apparatus for a vehicle including a controller configured to operate a window display and a speaker, the method comprising:
   checking, by the controller, whether information on an image and a voice of an occupant of a first other vehicle is received;
   in response to receiving the information on the image and the voice of the occupant of the first other vehicle, selecting, by the controller, a window display for outputting the image of the occupant of the first other vehicle and a speaker for outputting the voice of the first other vehicle based on a preset reference;
   operating, by the controller, the window display and the speaker to output the image and the voice of the occupant of the first other vehicle through the selected window and speaker;
   checking, by the controller, whether user input of requesting a change of output of the image and the voice of the occupant of the first other vehicle is received; and
   in response to receiving the user input, operating, by the controller, the window display and the speaker to change the output of the image and voice of the occupant of the first other vehicle according to the user input,
   wherein the preset reference includes a distance between an occupant of a subject vehicle and a window display of the subject vehicle.

15. The method of claim 14, wherein the selecting the window display for outputting the image of the occupant of the first other vehicle includes:
   determining, by the controller, an order of priority of the window display based on the distance between the occupant of the subject vehicle and the window display of the subject vehicle; and
   selecting, by the controller, the window display for outputting the image of the occupant of the first other vehicle according to the determined order of priority.

16. The method of claim 14, wherein the selecting the speaker for outputting the voice of the occupant of the first other vehicle includes:
   determining, by the controller, an order of priority of a speaker of the subject vehicle based on a distance between an occupant of the subject vehicle and the speaker of the subject vehicle; and
   selecting, by the controller, the speaker for outputting the voice of the occupant of the first other vehicle according to the determined order of priority.

17. The method of claim 14, wherein the outputting the image of the occupant of the first other vehicle through the selected window display includes:
   checking, by the controller, whether the number of images of occupants of the plurality of other vehicles, output to the selected window display, is equal to or greater than a reference number; and
   displaying, by the controller, the images of the occupants of the other vehicles in a partially overlapping manner in response to determining that the number of the images of the occupants of the other vehicles is equal to or greater than the reference number.

18. The method of claim 14, wherein the changing the output of the image of the occupant of the first other vehicle includes:
   changing, by the controller, focus of the image of the occupant of the first other vehicle, output to the window display, or changing an arrangement order of images of occupants of the other vehicles according to the user input.

19. A non-transitory computer-readable recording medium having recorded thereon a program for executing the method of claim 14.

20. A vehicle, comprising:
   a communication device configured to communicate with a first other vehicle; and
   a video telephony service provision apparatus configured to output an image of an occupant of the first other vehicle, received from the communication device, to a window display and to output a voice of the occupant of the first other vehicle, received from the communication device, to a speaker,
   wherein, in response to receiving information of the image and the voice of the occupant of the first other vehicle, the video telephony service provision apparatus is configured to:
     select a window display for outputting the image of the occupant of the first other vehicle and a speaker for outputting the voice of the occupant of the first other vehicle based on a preset reference;
     output the image and the voice of the occupant of the first other vehicle to the selected window display and the selected speaker; and
     change output of the image and the voice of the occupant of the first other vehicle according to the user input,
   wherein the preset reference includes a distance between an occupant of a subject vehicle and a window display of the subject vehicle.

\* \* \* \* \*